No. 853,566. PATENTED MAY 14, 1907.
W. SPARKS.
FERRULE ATTACHMENT FOR HANDLES.
APPLICATION FILED JAN. 2, 1907.
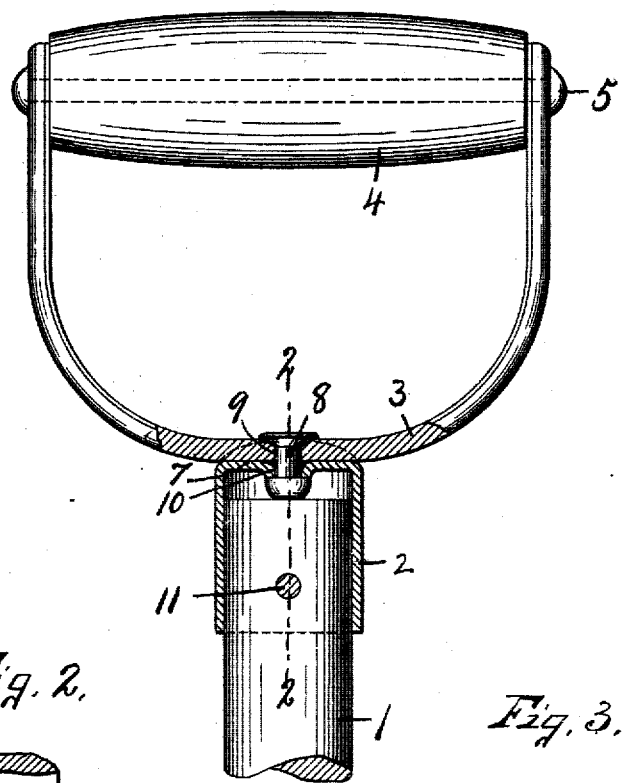
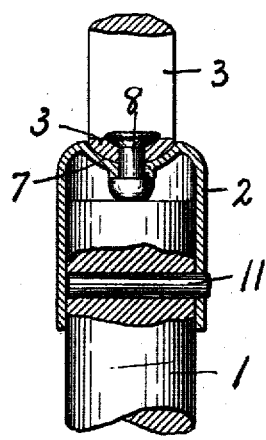
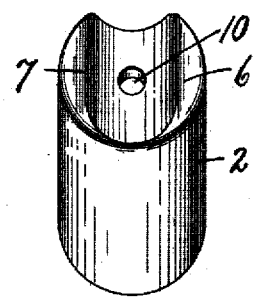
Witnesses.
Inventor.
William Sparks
By
Howard P. Denison
Attorney.

UNITED STATES PATENT OFFICE.

WILLIAM SPARKS, OF JACKSON, MICHIGAN, ASSIGNOR TO GEORGE A. McKEEL & COMPANY, LIMITED, OF JACKSON, MICHIGAN, A CORPORATION OF MICHIGAN.

FERRULE ATTACHMENT FOR HANDLES.

No. 853,566.　　　Specification of Letters Patent.　　　Patented May 14, 1907.

Application filed January 2, 1907. Serial No. 350,455.

*To all whom it may concern:*

Be it known that I, WILLIAM SPARKS, of Jackson, in the county of Jackson, in the State of Michigan, have invented new and useful Improvements in Ferrule Attachments for Handles, of which the following, taken in connection with the accompanying drawings, is a full, clear, and exact description.

This invention relates to certain improvements in ferrule attachments for uniting the handle and shank of shovels and similar articles and is particularly useful in connection with that class of handles in which the handle part or grip is mounted upon and between the ends of a U-shaped metal bar.

My object is to provide a simple, practical and efficient means for rigidly uniting the ferrule to the handle for receiving the shank of a spading fork, shovel or similar article. In other words, I have sought to rigidly unite the ferrule to the handle with as few parts and as little labor as possible and at the same time to increase the strength of the connection between the shank and handle of the article to which it is attached.

Other objects and uses will be brought out in the following description.

In the drawings,—Figure 1 is an elevation partly in section of my improved ferrule shown as connecting the handle and shank of a spading fork, shovel or similar instrument. Fig. 2 is a sectional view taken on line 2—2, Fig. 1. Fig. 3 is a perspective view of the detached ferrule.

In Figs. 1 and 2 I have shown a shank —1— of a spading fork, shovel or similar device, as united by a ferrule —2— to a U-shaped handle bar —3— having a hand piece —4— mounted on and between the upper ends of the bar —3—, being in this instance secured to the ends of said bar —3— by means of a transverse bolt —5— running through the ends of the bar —3— and axially through the hand piece —4—. The ferrule —2— is made in the form of an inverted cylindrical cup having a closed upper end —6—, the central portion of which is depressed within the cup forming a transverse groove —7— running transversely or diametrically across the top of the ferrule. In this particular instance, the groove —7— is nearly semi-circular in cross section and the lower face of the central portion of the bar —3— is of similar cross-section and is fitted snugly within the groove —7— where it is firmly secured to the ferrule by means of a rivet or bolt —8— which is passed through apertures —9— and —10— respectively in the bar —3— and adapted to the ferrule —2— and is upset at its opposite ends to firmly lock the ferrule —2— to the bar —3—. By thus snugly fitting the central portion of the bar —3— in the groove —7—, the side of the groove holds the bar against rotation upon the rivet —8—, the latter serving to lock the bar and ferrule to each other against relative movement and I am, therefore, enabled to unite the ferrule —2— and the handle bar —3— with the single rivet —8—. This ferrule —2— is preferably formed from a single piece of sheet metal and its lower end is left open for the reception of one end of the shank —1— which is secured within the ferrule by means of a bolt or key —11—, the upper end of said shank being snugly fitted within the ferrule to prevent relative movement of such parts one upon the other.

It is clear from the foregoing description that the handle comprising the bar —3— and hand piece —4— together with the ferrule —2— may be rigidly united to constitute an article of manufacture adapted to be sold as such for the reception of the shank of any implements to which such a handle may be adapted, and the essential feature of my invention consists in making the handle and ferrule in the manner described as a new article of manufacture.

Although I have shown and described the handle bar as riveted to the upper end of the ferrule, it is evident that these parts may be secured together by any other suitable fastening means, such as brazing or welding, and I do not, therefore, want to limit myself to the exact method of fastening herein shown and described.

What I claim is:

1. In combination with a handle bar, a ferrule having a portion of its top depressed within the ferrule forming a transverse groove, the top of the ferrule and bar being provided with alined apertures, and a bolt passed through said apertures and riveted on the under side of the top of the bar whereby the ferrule and bar are locked to each other.

2. A one-piece sheet metal ferrule having a closed top, the central portion of which is depressed within the ferrule forming a transverse groove, and a handle seated in the groove and secured to the ferrule.

3. As a new article of manufacture, a U-shaped handle bar, and a hand piece secured to and between the ends of the bar, and a ferrule having a closed top, a portion of which is depressed within the ferrule forming a groove in which the base of the U-shaped bar is seated, and a rivet passed through the top of the ferrule and bar for riveting the parts together.

4. A one-piece sheet metal ferrule having a closed top, the central portion of which is depressed within the ferrule forming a transverse groove.

In witness whereof I have hereunto set my hand this 26th day of December 1906.

WILLIAM SPARKS.

Witnesses:
W. WITHINGTON,
C. E. FELLOWS.